United States Patent [19]
Ydoate

[11] Patent Number: 5,275,272
[45] Date of Patent: Jan. 4, 1994

[54] CONVEYOR SYSTEM WITH ARTICLE DIVERTING MECHANISM

[75] Inventor: Edward Ydoate, Flemington, N.J.

[73] Assignee: Sandvik Process Systems, Inc., Totowa, N.J.

[21] Appl. No.: 45,526

[22] Filed: Apr. 6, 1993

[51] Int. Cl.[5] .............................................. B65G 47/46
[52] U.S. Cl. .................................... 198/367; 198/372; 198/697; 209/651
[58] Field of Search ........................ 198/367, 370-372, 457, 697, 698, 699, 719, 721, 732-734, 748, 749; 209/651-654

[56] References Cited

U.S. PATENT DOCUMENTS

| | | |
|---|---|---|
| 2,561,397 | 7/1951 | May et al. . |
| 3,045,801 | 7/1962 | Graybeal ............................ 198/372 |
| 3,650,566 | 3/1972 | Lee et al. . |
| 3,937,316 | 2/1976 | Gerhardt . |
| 4,058,202 | 11/1977 | Reist et al. . |
| 4,253,573 | 3/1981 | Dubberly et al. ............. 209/651 X |
| 4,682,684 | 7/1987 | Löthman ......................... 198/732 X |
| 4,890,723 | 1/1990 | Debuisson et al. ............ 198/734 X |
| 5,052,542 | 10/1991 | Wipf ................................ 198/372 |
| 5,052,544 | 10/1991 | Anderson ...................... 198/732 X |

FOREIGN PATENT DOCUMENTS

| | | | |
|---|---|---|---|
| 2620053 | 3/1989 | France ............................. 209/651 |
| 2620054 | 3/1989 | France ............................. 209/651 |

*Primary Examiner*—D. Glenn Dayoan
*Attorney, Agent, or Firm*—Burns, Doane, Swecker & Mathis

[57] ABSTRACT

A conveying system includes a transport conveyor and a diverter mechanism disposed thereabove for pushing articles transversely off the transport conveyor. The diverter mechanism includes a belt having paddles projecting therefrom. The belt is periodically driven to cause a paddle to transverse the main conveyor to displace an article. Each paddle is formed by two plates connected at their inner ends to the belt via hinges, with the hinge of one plate being spaced from the hinge of the other plate in the direction of belt travel. The outer ends of the plates are fixed together and sandwich a flexible wiper therebetween.

22 Claims, 2 Drawing Sheets

CONVEYOR SYSTEM WITH ARTICLE DIVERTING MECHANISM

BACKGROUND OF THE INVENTION

The present invention relates to an endless belt and in particular to a belt having paddles projecting therefrom for pushing objects off a transport conveyor.

Depicted in FIG. 1 is a conventional conveying system 10 which comprises a main transport conveyor 12 for conveying articles A therealong in a selected path of travel. Disposed at various locations along the transport conveyor 12 are chutes 14 onto which selected ones of the articles are to be diverted. For example, the articles could comprise thin envelopes or larger packages which are being sorted according to destination.

The articles can contain codes which are scanned by sensors (not shown) to provide a signal indicating which chute is to receive each particular article.

In order to direct the article onto the chute, a diverter mechanism 16 is arranged above the transport conveyor 12. That diverter mechanism 16 comprises a belt in the form of two spaced apart, narrow belt segments 18A, 18B. Alternatively, a single wide belt could be used. The belt segments are mounted on two pairs of pulleys 20, 22, each pair of pulleys being affixed to a common axle 24, 26. The axles are mutually parallel, and one of the axles is driven intermittently by a motor 28 by means of a drive belt 30.

Mounted to the belt segments is a plurality of paddles 32, 34 (e.g., two or more). Upon receipt of a signal, a motor 28 drives the belt segments by a selected distance in either direction to cause one of the paddles 32, 34 to pass across the conveyor 12 and displace an article A onto a respective chute 14.

The paddles are attached to each belt segment in a fixed manner, e.g., by being bolted to tabs 36 that are, in turn, fixed to the belt segments. For instance, the belt segments and tabs could be formed of urethane, with the tabs being fused to the belt segments.

It will be appreciated that as a paddle contacts a package, the paddle tends to be bent backwards, whereby forces will be transmitted by the paddle to its mounting tabs 36. Consequently, the tabs are stressed in a manner that can eventually produce a failure of their fused connections with the belt segments.

Moreover, in the event that the articles are thin and tend to lie flat against the transport conveyor (e.g., envelopes), it may be necessary to compensate for the tendency for a paddle to bend backwardly, and consequently pass over the article. Such compensation may be accomplished by arranging the paddle to have a length greater than the vertical distance from the belt to the transport conveyor. As a result, the paddle will tend to wipe across the transport conveyor. In so doing, however, the paddle will push downwardly against the article, whereby the friction forces between the article and transport conveyor are increased to such an extent that the article may resist being pushed laterally from the transport conveyor.

Therefore, it would be desirable to provide a diverter mechanism which minimizes stress at the connection between the paddle and belt, and which minimizes friction between the articles (especially thin articles) and the transport conveyor.

SUMMARY OF THE INVENTION

The present invention relates to a belt mechanism which comprises a belt, and at least one paddle mounted on the belt so as to project outwardly therefrom. The paddle includes first and second plates, each plate having inner and outer portions The outer portions are interconnected, and the inner portions are connected to the belt at first and second locations, respectively, which are spaced apart in a direction of belt travel. Each of the inner portions is connected to the belt for swinging movement relative thereto about an axis oriented transversely relative to a direction of belt travel.

Preferably, each of the inner portions is connected to the belt by a hinge having a hinge pin.

Each of the inner portions is preferably inclined so as to extend from the belt in an oblique direction.

Each paddle preferably includes an elastically flexible wiper sandwiched between the outer ends of the plates and projecting outwardly therebeyond.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF THE PREFERRED EMBODIMENT OF THE INVENTION

Figure 2:
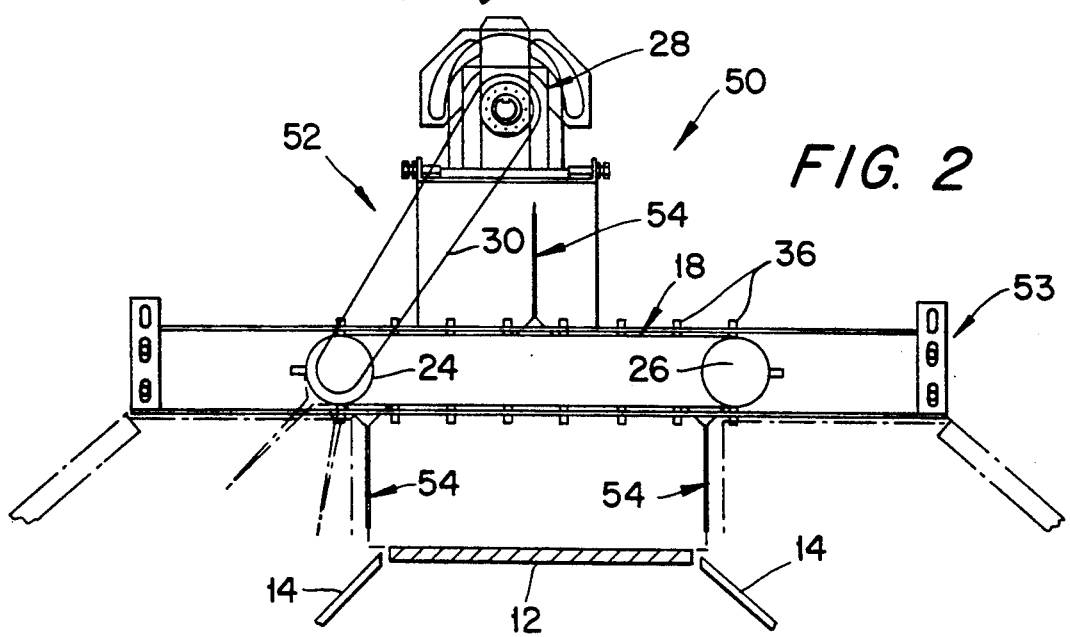
FIG. 2 is a front elevational view of a conveyor system according to the present invention.
Figure 3:
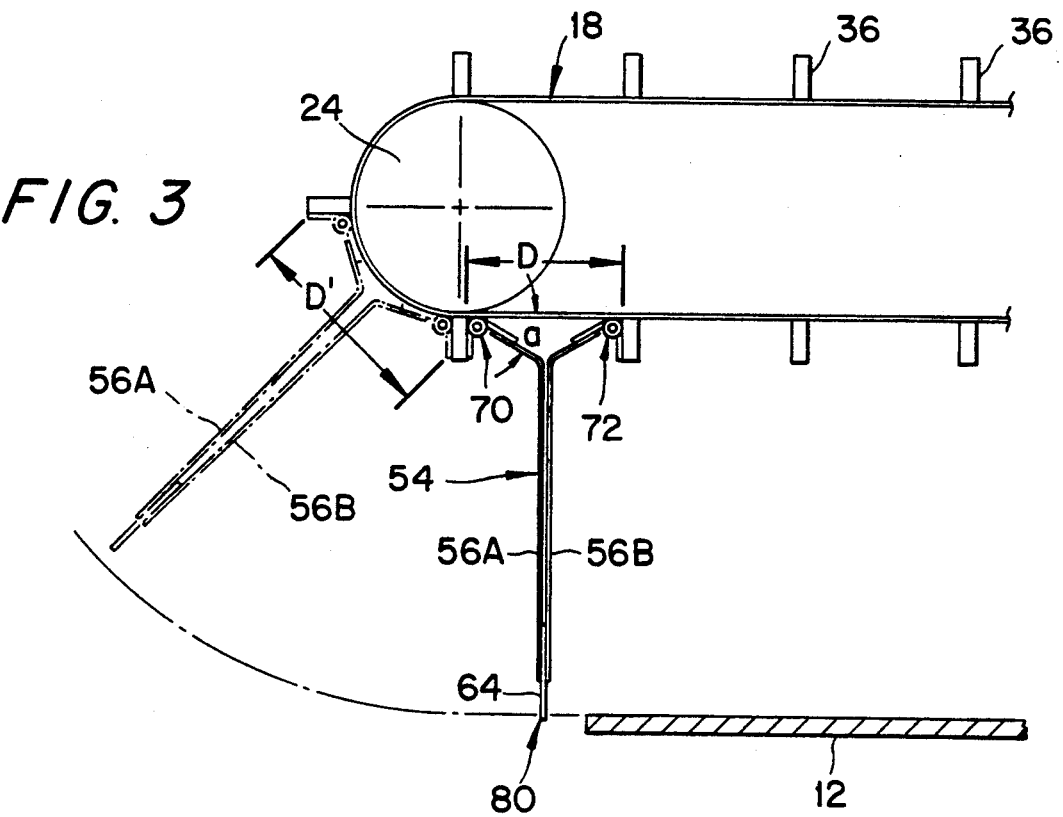
FIG. 3 is a partial front elevational view of the apparatus depicted in FIG. 2, wherein a paddle is depicted in phantom lines as it traverses a pulley.

A conveyor system 50 according to the present invention is depicted in FIGS. 2 and 3. That system includes a transport conveyor 12 for conveying articles along a path of travel, and chutes 14 onto which selected articles can be diverted by means of a diverter mechanism 52. The diverter mechanism includes a belt 18 formed of a single wide belt or a plurality of belt segments. The belt travels around a pair of pulleys 24, 26, one of which 24 is driven by a motor via drive belt 30.

The belt segments carries a plurality of tabs 36 which are fixed to the belt. The belt and tabs may be formed of urethane, for example, with the tabs being fused to the belt. Alternatively, the belt and tabs could be formed of any suitable material.

Affixed to the belt is a plurality, e.g, three, of diverter paddles 54. Those paddles are equidistantly spaced along the belt, and the diverter mechanism is operated such that during each article-diverting operation, each paddle changes places with one of the other paddles. It will be appreciated that two paddles are disposed along opposite edges of the transport conveyor 12 so that an article can be pushed from either edge of the transport conveyor, depending upon the direction of rotation of the drive motor 28.

The diverter mechanism 52 is supported above the transport conveyor by a framework 53, whereby the vertical spacing between the belt 18 and the transport conveyor 12 can be adjusted.

Figure 4:
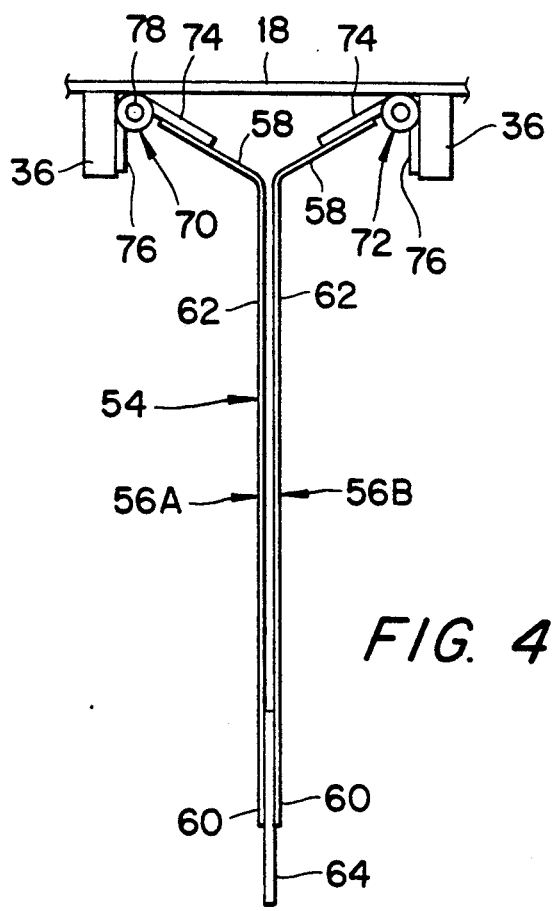
FIG. 4 is a fragmentary enlarged view of a paddle depicted in FIG. 3.

The paddles 54 and the manner in which they are mounted to the belt 18 are more clearly depicted in FIGS. 3 and 4. All paddles 54 are of identical construction and are mounted in identical fashion to the belt 18. Each paddle 54 comprises first and second plates 56A, 56B, preferably formed of an elastically flexible material such as spring steel. Each plate includes inner and outer portions 58, 60, respectively, and an intermediate portion 62 extending therebetween. The intermediate portions 62 are disposed generally parallel to one another, and the inner portions 58 are inclined such that they each converge in a direction away from the belt by an acute angle a.

The outer portions 60 are interconnected, e.g., by bolts, rivets, etc., so as to sandwich therebetween an elastically flexible wiper 64.

Figure 1:
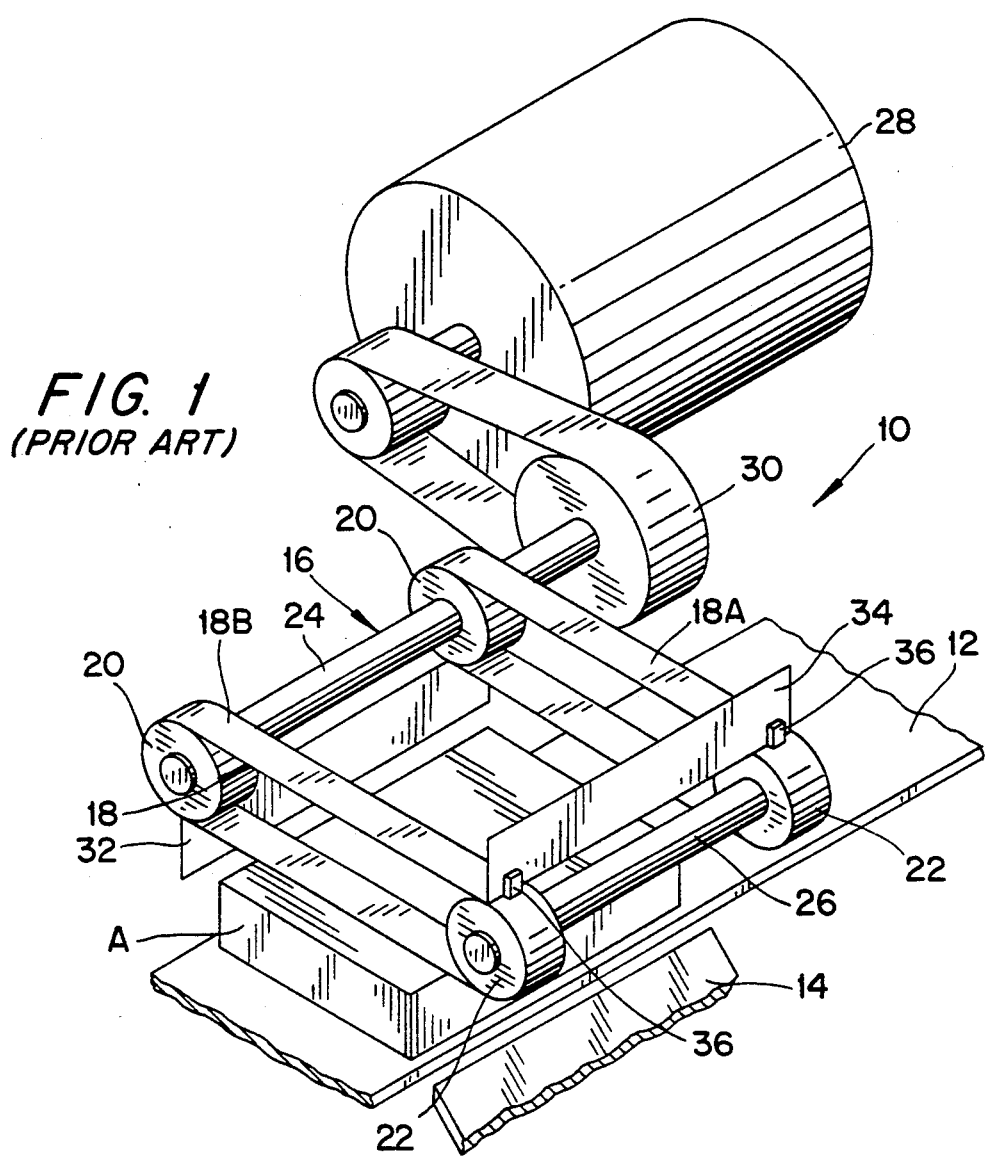
FIG. 1 is a perspective view of a prior art conveyor system.

The inner portion 58 of each plate is connected to the belt 18 in a manner which enables the plate to swing relative to the belt about an axis extending transversely of the direction of travel of the belt, e.g., about an axis extending parallel to the axes of rotation of the pulleys 24, 26. In particular, the first plate 56A is connected to the belt 18 by hinges 70 (only one hinge 70 depicted in FIG. 4), and the second plate 56B is connected to the belt 18 by hinges 72 (only one hinge 72 depicted in FIG. 4), the hinges 70 being spaced apart from the hinges 72 in the direction of belt travel. It will be appreciated that if the belt 18 were comprised of two belt segments 18A, 18B as shown in FIG. 1, then the first plate 56A would be connected to both belt segments by two hinges 70, and the second plate would likewise be connected to both belt segments by two hinges 72.

Each of the hinges 70, 72 includes first and second portions 74, 76 rotatably interconnected by a hinge pin 78. The first portion 74 is fixedly attached to the plate 56A (or 56B), and the second hinge portion 76 is fixedly attached to a tab 36. Those connections of the hinge portion can be made by bolts or any suitable fastening.

Since each paddle is connected to the belt at two locations spaced apart in the direction of belt travel, the paddle is relatively rigid and vertically stable.

Furthermore, due to the pivoting afforded by the hinged couplings 70, 72, the paddles can traverse the pulleys 24, 26 without imparting appreciable stress to the tabs 36. In that regard, it will be appreciated that successive tabs 36 are parallel and separated by a distance D when the tabs are situated along the flat upper and lower flights of the belt 18. However, when the tabs are traversing a pulley, the tabs are not parallel, i.e., they assume a relationship in which they diverge in a direction away from the belt, whereby the distance D' between outer ends of the tabs is increased. According to the present invention, each paddle is able to adapt to that dimensional change, due to (i) the ability of the upper ends of the plates to move away from one another, and (ii) the ability of the hinge portions 74, 76 to pivot relative to one another.

The upper ends of the plates can move away from one another, because the plates are able to flex about their interconnected lower ends, as shown in the broken lines in FIG. 3. It will also be apparent from the broken-line showing of the hinge portions 74, 76 in FIG. 3 that the angle formed between those portions increases as the paddle is traversing the pulley 24. This angle increase is, of course, made possible by the ability of the hinge portions to pivot about the hinge pins.

It would be possible within the scope of the invention to form the hinge portions of integral one-piece construction, whereby those portions could flex (bend) about the joint formed therebetween However, it is preferable to use a hinge pin so that less resistance to pivoting occurs, and so that no appreciable fatigue stress is imposed on the hinge portions.

It will also be appreciated that, as shown in broken lines in FIG. 3, the hinge portion 74 connected to the paddle approaches the belt 18 as the paddle traverses the pulley 24. Thus, the provision of angle a between the belt and the upper portions 58 of the paddle plates enables the hinge portion 74 to pivot without contacting the belt.

Since the paddles remain rigid and vertically stable as they displace an article from the transport conveyor 12, rather than being bent backwards as in the prior art, the distance between the outer end 80 of the paddle and the top surface of the transport conveyor 12 will not vary. Hence, there is no need to make the paddle length longer than the spacing between the belt 18 and the transport conveyor 12 as in the prior art in order to produce a pronounced flexing (wiping action) of the paddle for displacing thin articles such as envelopes. Rather, the paddle can be arranged such that the outer end 80 thereof just makes contact with the transport conveyor and thus only applies a lateral force to the envelopes. That is, the paddle will not apply appreciable downward force to the envelopes (as could occur in the case of a pronounced wiping action) which could prevent the envelopes from being displaced from the transport conveyor.

In practice, articles, such as boxes, envelopes, etc., are transported along the transport conveyor 12. When an article reaches a chute 14 onto which it should be diverted, the motor 28 is energized to drive the belt 18 in one direction or the other for a sufficient interval to enable the three paddles 54 to exchange places. In so doing, one of the paddles will travel laterally across the transport conveyor 12 to displace the article therefrom and onto the chute 14. As this occurs, the paddle remains rigid and vertically stable, i.e., it will not bend backwards to an appreciable extent, since its upper end is connected to the belt 18 at two locations spaced in the direction of belt travel.

As each paddle traverses a pulley 24 or 26, the upper portions 58 of the two paddle plates 56A, 56B thereof will separate from one another, and its hinge portions 74 will pivot relative to the hinge portions 76 to compensate for the spreading apart of the tabs 36. Hence, little, if any, stress will be imposed on those tabs by the paddle as the paddle traverses a pulley. When the paddle reaches one of the flat upper or lower horizontal flights, the plates 56A, 56B will reassume the position depicted in FIG. 4.

In accordance with the present invention, paddles are utilized which will not bend backwards to an appreciable extent while pushing an article from the transport belt. This is achieved by a structure which will not cause the paddle-mounting tabs to be significantly stressed and broken off. Articles such as thin envelopes can be displaced by the paddles with little or no downward force being applied thereto which could result in the envelopes being able to avoid displacement from the transport conveyor.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

For example, although the outer portions 60 of the plates 56A, 56B of each paddle are disclosed as being fixedly interconnected such that the plates must flex in order to permit the inner portions 58 to move toward and away from each other, it would be possible to join the outer portions by hinges having hinge pins which enable the plates to pivot.

What is claimed is:

1. A belt mechanism comprising a belt, and at least one paddle mounted on said belt and projecting outwardly therefrom, said paddle including first and second plates, each plate having inner and outer portions, said outer portions being interconnected, and said inner portions being connected to said belt at first and second locations, respectively, spaced apart in a direction of belt travel, each of said inner portions being connected to said belt for swinging movement relative thereto about an axis oriented transversely relative to a direction of belt travel.

2. A belt mechanism according to claim 1, wherein each of said inner portions is connected to said belt by a hinge having a hinge pin.

3. A belt mechanism according to claim 2, wherein said belt carries a plurality of tabs projecting laterally from said belt, said hinges being attached to respective ones of said tabs.

4. A belt mechanism according to claim 3, wherein said tabs are fused to said belt.

5. A belt mechanism according to claim 2, wherein said inner portions are inclined so as to extend from said belt in an oblique direction.

6. A belt mechanism according to claim 5, wherein said paddle includes an elastically flexible wiper projecting outwardly beyond said outer portions of said plates.

7. A belt mechanism according to claim 1, wherein said inner portions of said plates of each paddle are inclined so as to extend from said belt in a mutually converging manner.

8. A belt mechanism according to claim 7, wherein each of said plates includes an intermediate portion extending outwardly from a respective inner portion, said intermediate portions of each paddle being oriented substantially parallel to one another.

9. A belt mechanism according to claim 8 including an elastically flexible wiper sandwiched between said outer portions of said plates, said wiper projecting outwardly beyond said plates.

10. A belt mechanism according to claim 1, wherein said paddle includes an elastically flexible wiper projecting outwardly beyond said outer portions of said plates.

11. A belt mechanism according to claim 1, wherein each of said plates is formed of spring steel so as to be able to flex elastically about its out portion.

12. A conveying system comprising:
a transport conveyor for transporting articles along a path of travel, and
a diverter mechanism positioned above said transport conveyor for pushing selected articles transversely off said conveyor, said diverter mechanism comprising:
an endless belt mounted on a plurality of pulleys rotatable about substantially parallel horizontal axes and such that said belt forms a first flight extending laterally across said transport conveyor,
a plurality of paddles mounted on said belt and projecting outwardly therefrom, each paddle including first and second plates having inner portions connected to said belt at first and second locations, respectively, which are spaced part in a direction of belt travel, each of said inner portions being connected to said belt for swinging movement relative thereto about an axis oriented parallel to said pulley axes, said first and second plates including outer portions connected together to enable said inner portions to move toward and away from one another as its respective paddle traverses a pulley, and
drive means for intermittently rotating said belt such that a paddle passes across said transport conveyor for pushing an article therefrom.

13. A belt mechanism according to claim 12, wherein each of said inner portions is connected to said belt by hinge having a hinge pin.

14. A belt mechanism according to claim 13, wherein said belt carries a plurality of tabs projecting laterally from said belt, said hinges being attached to respective ones of said tabs.

15. A belt mechanism according to claim 14, wherein said tabs are fused to said belt.

16. A belt mechanism according to claim 13, wherein said inner portions are inclined so as to extend from said belt in an oblique direction.

17. A belt mechanism according to claim 16, wherein said paddle includes an elastically flexible wiper projecting outwardly beyond said outer portions of said plates.

18. A belt mechanism according to claim 12, wherein said inner portions of said plates of each paddle are inclined so as to extend from said belt in a mutually converging manner.

19. A belt mechanism according to claim 18, wherein each plate includes an intermediate portion extending outwardly from a respective inner portion, said intermediate portions being oriented substantially parallel to one another.

20. A belt mechanism according to claim 19 including an elastically flexible wiper sandwiched between said outer portions of said plates of each paddle, said wiper projecting outwardly beyond said outer portions.

21. A belt mechanism according to claim 12, wherein each paddle comprises an elastically flexible wiper projecting outwardly beyond said outer portions of said plates.

22. A conveying system comprising:
a transport conveyor for transporting articles along a path of travel, and
a diverter mechanism positioned above said transport conveyor for pushing selected articles transversely off said conveyor, said diverter mechanism comprising:
an endless belt mounted on a plurality of pulleys rotatable about substantially parallel horizontal axes and such that said belt forms a first flight extending laterally across said transport conveyor,
a plurality of paddles mounted on said belt and projecting outwardly therefrom, each paddle including first and second plates having inner portions connected to said belt at first and second locations, respectively, which are spaced part in a direction of belt travel, each of said inner portions being connected to said belt by a hinge pin for swinging movement relative thereto about an axis oriented parallel to said pulley axes, said first and second plates including outer ends fixedly interconnected, said plates being formed of spring steel to enable said inner ends to move elastically toward and away from one another as a paddle traverses a pulley, an elastically flexible wiper sandwiched between said outer ends and projecting outwardly therefrom, and drive means for intermittently rotating said belt such that a paddle passes across said transport conveyor for pushing an article therefrom.

* * * * *